United States Patent [19]
Yamamoto

[11] Patent Number: 5,243,565
[45] Date of Patent: Sep. 7, 1993

[54] METHOD OF MEASURING DIRECTIONAL SPECTRA OF SURFACE GRAVITY WAVES

[75] Inventor: Tokuo Yamamoto, Miami, Fla.
[73] Assignee: University of Miami, Miami, Fla.
[21] Appl. No.: 744,527
[22] Filed: Aug. 13, 1991
[51] Int. Cl.$^5$ ............................................. G01S 3/80
[52] U.S. Cl. .................................. 367/131; 367/136; 367/15; 367/124
[58] Field of Search .............. 367/135, 136, 118, 124, 367/15, 131; 340/565, 566; 73/170 A

[56] References Cited
U.S. PATENT DOCUMENTS

| | | | |
|---|---|---|---|
| 4,807,199 | 2/1989 | Yamamoto et al. | 367/15 |
| 4,951,264 | 8/1990 | Yamamoto et al. | 367/15 |

*Primary Examiner*—Daniel T. Pihulic
*Attorney, Agent, or Firm*—Austin R. Miller

[57] ABSTRACT

A new method for measurement of the directional spectra of surface gravity (water) waves. Measurements are made at a single point by orthogonally mounted seismometers buried below the seabed surface and a pressure sensor resting on the seafloor or buried below the seabed. The maximum entropy principle is used to find the directional distribution function for the waves traveling through the sediments as measured by the seismometers. This function is combined with the frequency spectra of the ocean surface waves to form the directional spectra of the surface gravity waves. The method produced high directional resolution for instruments that were adequately coupled with the seabed. The method is also capable of detecting objects moving through water, such as surface ships and submarines.

11 Claims, 5 Drawing Sheets

METHOD OF MEASURING DIRECTIONAL SPECTRA OF SURFACE GRAVITY WAVES

This invention was made with U.S. government support under Grant No. N00014-89-J-1146 awarded by the Department of the Navy. The government has certain rights in the invention.

This invention relates to a method of measuring directional spectra of surface gravity waves in oceans, bays and other open bodies of water, and is particularly directed to the performance of such measurements in a body of water having a sedimentary bottom and a plurality of waves in motion above a bottom sediment. This invention relates to the measurement of directional spectra in relatively shallow waters. In particular, because it can be completely buried within the seabed, this invention leads to obtaining accurate wave movement data even under extreme conditions such as those encountered in heavy storms or hurricanes. Furthermore, it can be used as a hidden sensor for wave producing bodies.

FIELD OF THE INVENTION

Measurements of the energy density of ocean surface waves as a function of wave frequency and wave propagation direction are essential to many aspects of ocean and coastal engineering. Directional spectra are used in the design and analysis of moorings, piles and offshore towers, in the prediction of ship response, for wave forecasting and hindcasting, and in the study of sediment transport and pollution control. Furthermore, a hidden sensor for wave generating moving objects is badly needed for military purposes.

PRIOR ART

Many methods for measuring directional spectra have been proposed. Remote sensing by light or radio waves is possible. More often, direct in situ measurements are used. These can be provided by a horizontal array of instruments measuring one wave property, or from a single instrument package measuring three or more wave properties, first proposed by Longuet-Higgins et al (*Ocean Wave Spectra*, Prentice-Hall (1963) pages 111-136).

Arrays can be difficult to implement. If the array spacing is larger than one-half wavelength of the frequency being analyzed, spatial aliasing occurs. When the spacing is small, the long-wave estimates tend to be smeared due to noise according to Jefferys, *Direction Wave Spectra Applications*, ASCE (1982), 203-219. Therefore, there is a need for many instruments of variable spacing for good resolution without aliasing.

Special configurations such as star arrays are used to minimize the number of instruments while maintaining acceptable resolution (*Goda University of Tokyo Press*, 323 pp., 1983) Also, convolution with data adaptive windows such as is the case with the so-called Maximum Likelihood Method (MLM) developed by Capon (*Topics in Applied Physics* 34, *Nonlinear Methods of Spectral Analysis*, 2nd Ed., S. Haykin, Ed., Springer-Verlag, Chap. 5, 1983), may be used to improve resolution. Hashimoto et al (*Report of the Port and Harbor Research Institute*, Yokosuka, Japan, 1987) recently used a Bayesian approach to estimate directional spectra for use with wave records consisting of at least four elements of wave properties. The Bayesian approach, originally proposed by Akaike (*Likelihood and Bayes Procedure, Bayesian Statistics*, J. M. Bernardo, M. H. DeGroot, D. U. Lindley and A. F. M. Smith, Eds., University Press, 143-166, 1980), is capable of high resolution even when the cross-power spectra are contaminated with estimation errors. This model showed better resolution for various numerical and field tests than MLM, but cannot be used for a three element wave record. Observation at a single point (a three element wave record) is useful for ease of implementation and expense compared to arrays, as well as for measurement of nonuniform wave fields characterized by refraction and diffraction.

Longuet-Higgins' method for measuring at a single point uses a non-negative smoothing function to weight the Fourier series coefficients, which removes the negative sidelobes but produces poor resolution. The resolution can be improved by increasing the number of quantities measured. Use of a cloverleaf buoy proposed by Mitsuyasu ("Observation of the directional spectrum of ocean waves using a cloverleaf buoy", *J. Phys. Oceanography*, 5, 750-760, 1975), for example, increases the number of measured wave properties and therefore achieves improved resolution.

Another way to improve resolution is to fit an assumed directional spreading function to the measured one. However, if the assumed function is independent of the data, the estimate may be biased if the true spectrum is different (Kobune and Hashimoto, "Estimation of directional spectra from the maximum entropy principle", *Proc. Fifth Int. Offshore Mechanics and Arctic Engineering (OMAE) Symp.*, Tokyo 80-85, 1986). Data adaptive models such as MLM, extended for this purpose by Isobe ("Extension of the MLM for estimating directional wave spectrum", *Symp. on Description and Modeling of Directional Seas*, Pap. No. A-6, 15 pp., 1984), and the Maximum Entropy Principle model developed by Kobune and Hashimoto can be used to remove this bias. These do not have fixed window functions associated with them and therefore can adjust to the true spectrum.

The Maximum Entropy Method (MEM), first introduced by Burg ("Maximum-entropy and data-adaptive procedures in the investigations of ocean waves", *Maximum-Entropy and Bayesian Methods in Inverse Problems*, C. R. Smith and W. T. Grady, Eds., D. Reidel, 429-442, 1985), was used as a nonlinear spectral estimation for a time series. Burg proposed that instead of using zero for covariance values outside of the data record, one could use artificial covariance values based on information content (maximizing entropy) to increase resolution (McDonough, "Topics in Applied Physics", Vol. 34, *Nonlinear Methods of Spectral Analysis*, 2nd ed., S. Haykin, Ed., Springer-Verlag, 1983). Lacoss ("Data adaptive spectral analysis methods", *Geophysics*, 36(4), 661-675, 1971), comparing MLM to MEM, found MEM to have better resolution. Burg also showed that both MLM and MEM produced the true spectrum for a simulated broad spectrum.

Kobune and Hashimoto recognized that the directional spreading function had the same properties as a joint probability distribution function and therefore information theory could be used to estimate the spreading function. The cross-spectral values are found by direct Fourier transform, after which the maximum entropy principle is applied to find the directional spread Borgman ("Maximum-entropy and data-adaptive procedures in the investigations of ocean waves", *Maximum-Entropy and Bayesian Methods in Inverse Problems*, C. R. Smith and W. T. Grady, Eds., D. Reidel, 429-442, 1985) has also outlined the use of data adaptive methods to analyze the wavenumber data after transformation to the frequency domain by a discrete Fourier transform.

OBJECTS OF THE INVENTION

It is accordingly an object of this invention to provide a method of measuring directional spectra surface gravity waves in a body of water having a sedimentary bottom and a plurality of waves moving above the bottom sediment. The waves may be generated naturally or by a moving object in the water.

It is a further object of the invention to obtain more accurate and reliable data than heretofore available, and to obtain such data with the use of single pair of orthogonally horizontally placed geophones buried in the seabed or sediment and a pressure sensor which may be exposed or buried in the seabed.

A further object of the invention is to measure wave propagation directions and wave pressure variations which concurrently yield data as to wave height and wave height variations.

It is still a further object of this invention to obtain data for purposes of beach protection, in shallow waters, and to provide accurate data regarding wave height and direction even under severe conditions such as those encountered in storms, hurricanes or the like.

It is a further object of this invention to obtain the types of data referred to above with the use of only a single point instrument.

It is a further object of this invention to obtain a tactical advantage of a wave detecting sensor completely buried within the seabed and thus not detected.

Other objects and advantages of this invention, including the ready adaptability of the same to a wide variety of shallow water conditions, will further become apparent hereinafter, and in the drawings.

BRIEF DESCRIPTION OF THE INVENTION

Figure 1:
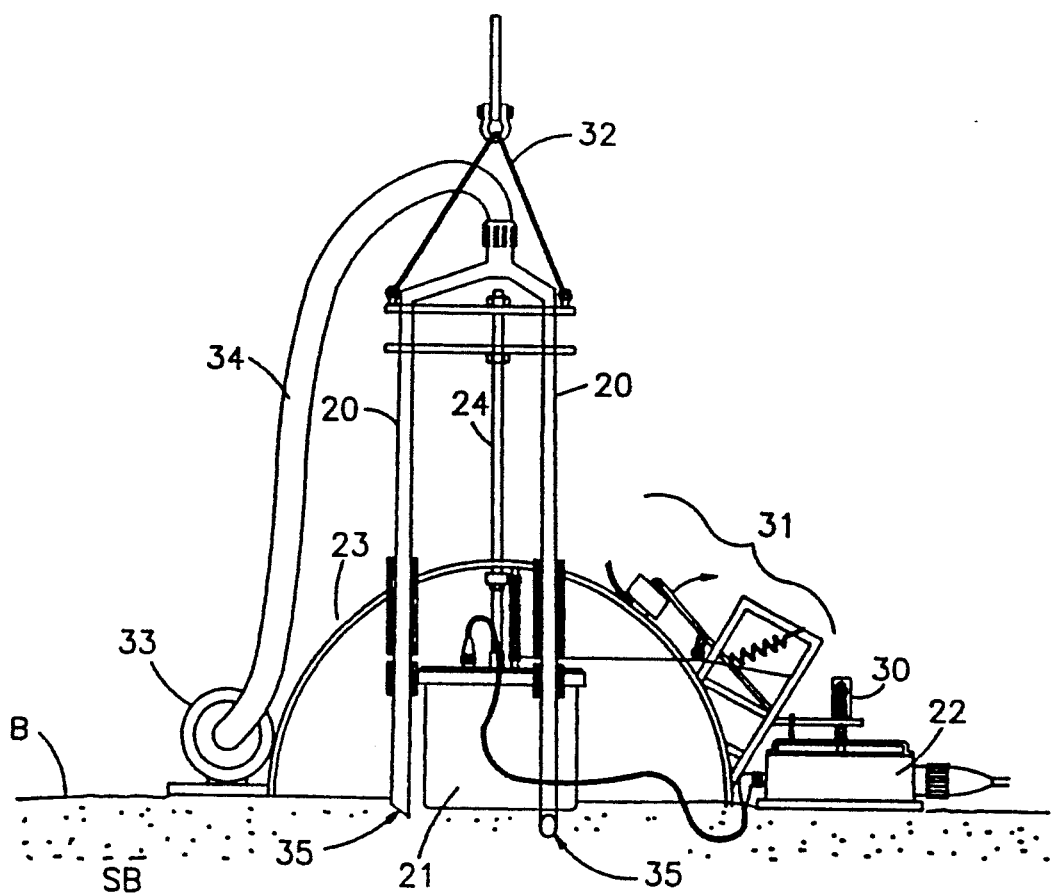
FIG. 1 shows an apparatus for burying a seismometer housing in a seabed sediment (U.S. Pat. No. 4,951,264)
Figure 2:
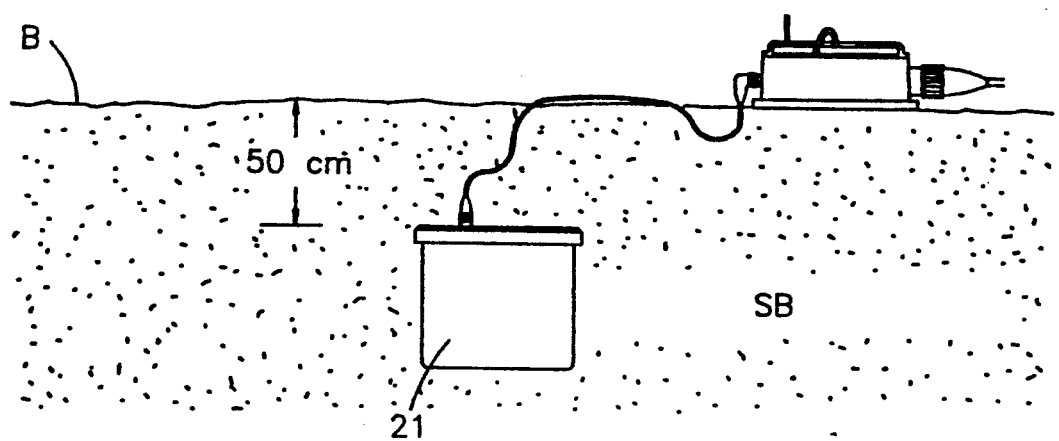
FIG. 2 shows a buried seismometer housing.

This invention uses the maximum entropy model proposed by Kobune and Hashimoto, previously referred to, but with data collected from a pair of bottom seismometers buried in the substrate and a pressure sensor buried or exposed in shallow water. Until now, single-point data have been collected using a pitch-roll buoy (which measures water surface elevation and two orthogonal components of surface slope), a cloverleaf buoy (which measures the same as well as three components of water surface curvature), or by current meters with a pressure sensor to measure orbital velocities and water surface elevation (Panicker, "Review of techniques for directional wave spectra", *Ocean Waves Measurement and Analysis*, ASCE, 669-688, 1974). Also, to measure velocity gradients, three current meters have been employed close together by Simpson, previously referred to. Buoys are subject to large nonlinear motions (caused by their not being fixed relative to the waves) and to flipping over in heavy seas. Current meters need to be moored or fixed to a structure, which limits their usefulness and may also affect the wave field being measured.

It is highly beneficial to take advantage of the discovery that the seabed motion is coupled to the traveling surface gravity waves due to pressure fluctuations (Yamamoto et al, H. Koning, H. Sellmeijer and E. Van Hijum, "On the response of a poroelastic bed to water waves", *J. Fluid Mech.*, 87(1), 193-206, 1978; Yamamoto, T. and T. Torii, *Geophys. J. Roy. Astron. Soc.*, 85, 413-431, 1986; Trevorrow et al, *Mar. Geophys. Res.*, 11(2), 129-152, 1989; *J. Acoust. Soc. Am.*, 86(6), 2318-2327, 1989). The directional spreading function can be found for the sediment waves using horizontal seabed accelerations and then combined with the frequency spectra of the surface waves as measured from hydrodynamic pressure to form the directional spectra.

A series of experiments have been conducted in July 1988 off the coast of New Jersey. The purpose of these experiments was to test a Bottom Shear Modulus Profiler (U.S. Pat. No. 4,807,199) (BSMP) system (see Trevorrow et al, *Geophys. J. Roy. Astron. Soc.*, 93, 419-496, 1988; Yamamoto et al, *Geophys. J. Int.*, 98, 173-182, 1988). Experiments using a completely buried pressure sensor and seismometers as compared with arrays of pressure sensors have been made at U.S. Army Corps. Field Experiment Station at Duck, N.C., in 1990 (U.S. Army Corp. News Letter). Fortunately, the Ocean Bottom Seismometer data collected were also well suited for use with the Maximum Entropy Principle directional spectra estimation method (MEPOBS). The extended MLM is also tested for comparison purposes.

This invention is advantageously carried out by measuring directional spectra of surface gravity waves in a body of water having a sedimentary bottom and a plurality of waves spaced above a bottom sediment, using steps which comprise:

(a) selecting a measurement site at which the distance from the surface of the water to the bottom sediment is less than the average wavelengths of the waves as measured along the surface;

(b) burying a pair of seismometers in the bottom sediment;

(c) deploying a pressure sensor on the bottom or buried in the seabed; and (d) periodically measuring the directional distribution function for the waves traveling through the sediment and the pressure detected by the pressure sensor.

The following Examples have been selected as illustrative but are not intended to limit the invention or the appended claims.

EXAMPLES

Typical water depth at a selected shallow water ocean site was 12 meters. Ocean bottom seismometers were well coupled to the seabed with respect to horizontal motions. For a test of a single unit, it was necessary to check pressure to seismometer coherence, phase, and seismometer leveling to determine if the unit gave acceptable data before data collection began. If after checking it was found that any of these relationships was not right, the instrument was pulled up, checked and deployed again.

The success of this method relies on good coupling between the seismometers and the seabed sediment.

Good coupling produces high coherence (minimum noise contamination) between pressure and seismometer signals, especially for the horizontal seismometers. In the course of similar shallow water, ocean bottom seismometer experiments in 1986-88, Trevorrow et al, *Mar. Geophys Res.*, Res. 11(2), 129-152, 1989, found that it was necessary to bury the seismometer housing in the surficial sediments and that the housing should be neutral density in the sediments. This negates the effects of near-bottom currents and ensures that the seismometers follow the sediment motions exactly. Also, a buried instrument is less susceptible to storm forces and physical damage. The burial operation is more difficult to implement than a simple mooring, but well worth the effort given the improvement in data quality.

A hydraulic jet burial system according to this invention is shown in the attached drawings. The burial system of FIG. 1, used in conjunction with a support vessel, typically consists of a three-pronged burial bracket 20 which holds the seismometer housing 21. The pressure sensor housing 22 is mounted outside a burial dome 23 and remains on or buried under the seabed B during data collection. A vertical rod 30 connected to the dome 23 by a magnetic release connection 31 keeps the pressure sensor housing aligned with the dome and therefore with the seismometers during burial. This is of paramount importance because a compass is mounted in the pressure housing in order to avoid magnetic interactions with seismometers.

An electric pump 33 is connected through a hydraulic supply hose 34 and to the vertical pipes of the three-pronged burial bracket 20 to pump water downwardly through openings 35 to bury the seismometer package 21 firmly and securely in the seabed.

After burying the seismometer package 21 and optionally the pressure sensor 22, the dome 23 is pulled off the seabed B with the use of the hoist 32 operated by a support vessel or the like. When the dome 23 pulls off, the sensors in the pressure sensor housing 22 remain aligned so that any error in the heading is held to less than ±10°. The directional distribution relative to the heading is not affected by the lift-off of the burial dome 23.

Directional headings and wind conditions are measured using the ship's meteorological equipment, which corrects for local magnetic declination. These and the measured sea states can be found in Table 1. The ocean bottom seismometer headings are also corrected for local magnetic declination.

The seismometer package 21 is buried in the sediment SB to a predetermined depth, for example 0.5 m, using seawater pumped at high pressure through the prongs 20, 20 of the burial bracket. Water jets at the tips of prongs 20, 20 liquify the sediment allowing the seismometer package 21 to sink of its own weight.

After the electromagnetic release mechanism 31, controlled from the ship and known per se, releases the instruments from the burial dome 23, and the burial dome 23 is brought back up to the support ship, determinations are made using tiltmeters fixed inside the seismometer housing 21 whether the seismometer package 21 is level. If the tilt is greater than about 10°, or if the compass is observed to take an erratic swing as the dome 23 is pulled up, the package is hauled up to the support ship and redeployed.

Typically one to five attempts were found to be necessary to successfully implant the seismometer housing 21 in the sea bottom SB. One major problem is that the ship needs to remain stationary relative to the seabed SB during the deployment of the instruments and also during data collection. This sometimes necessitates two or three-point mooring of the ship, which is physically difficult in rough weather. A more permanent installation may be implemented through the use of either independent surface radio-telemetry buoys or hardwiring to the shore.

The seismometer housing 21 (desirably an aluminum alloy cylinder) may contain three orthogonally (vertical, radial and transverse) mounted seismometers and two pendulum tiltmeters. The pressure housing is a flat aluminum cylinder and contains a compass, power supply, pressure sensor pre-amplifier and pressure sensor. The units are connected to the support ship by electro-mechanical cable.

In our test work data were recorded for typical durations of 8 hours. The analogue signals were amplified, filtered and then recorded on 14 channel, 0.5 inch magnetic tape by FM data recorders. They were later digitized at 4 Hz. The data were then converted to frequency space and corrected for the frequency response of the instruments. The optimum averaging time (long enough to reduce spectral uncertainties, but short enough so as to not include nonstationarity effects) in general cannot be predicted. The typical stationary time period was found to be in the range of 2 to 8 hours. A 4096-point (17 minutes) FFT with a 50 percent overlap averaging method was implemented to find the cross-power spectrum between signals. Each time segment was demeaned and multiplied by a 10 percent cosine taper window before being transformed into spectral components. Spectra shown here are averaged over 8 hours.

Figure 3A:
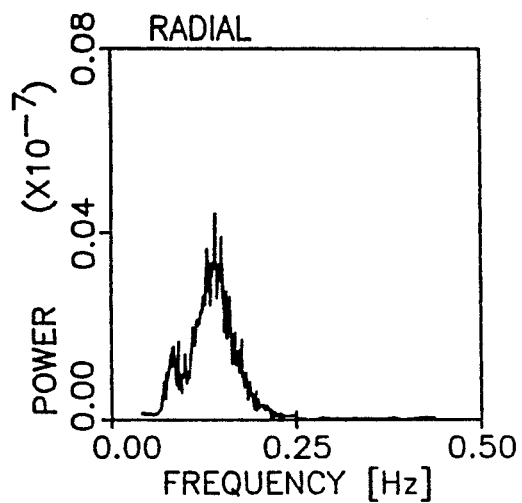
FIGS. 3(a)-3(c) show the power spectra of the pressure, radial and transverse accelerations.
Figure 3B:
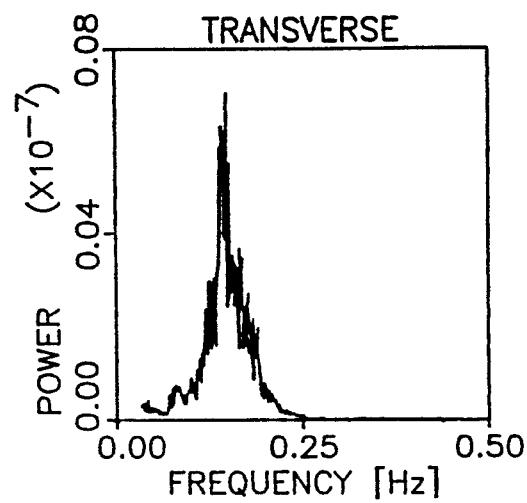
Figure 3C:
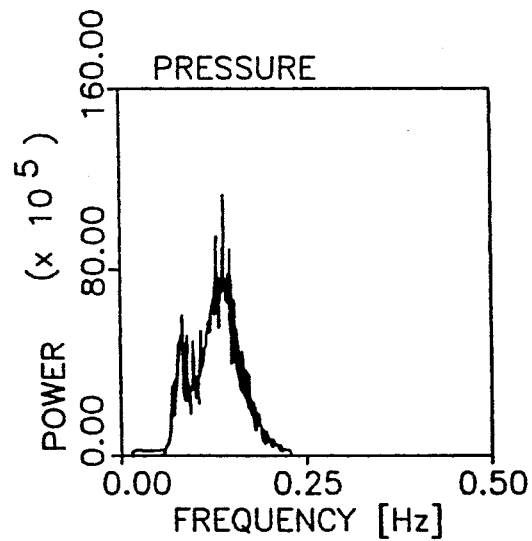
Figure 4A:
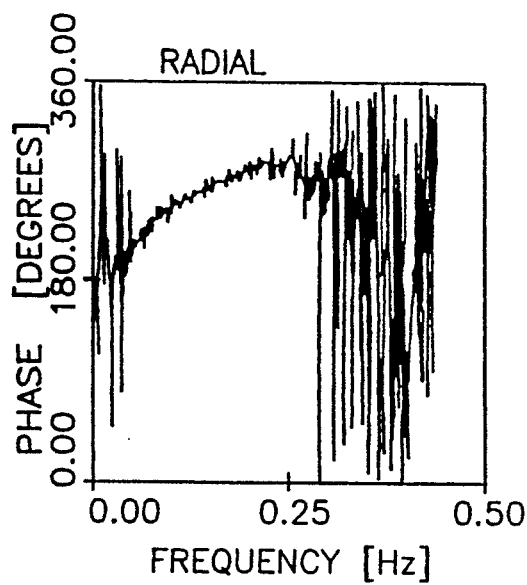
FIGS. 4(a)-4(d) show plots of coherence and phase.
Figure 4B:
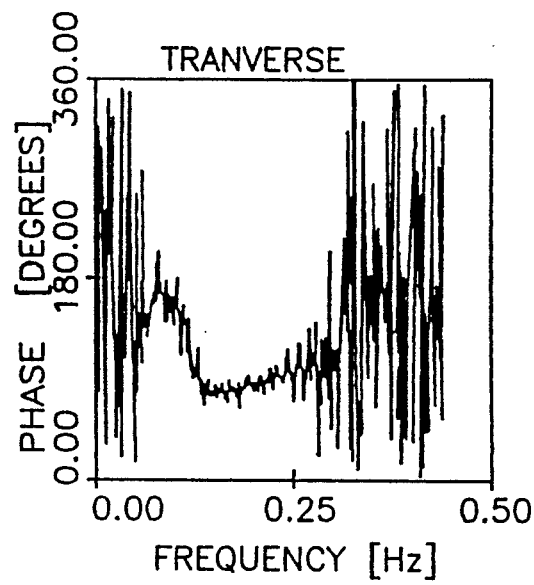
Figure 4C:
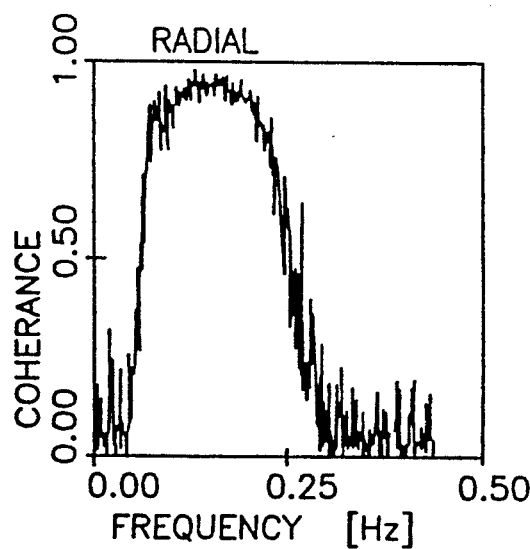
Figure 4D:
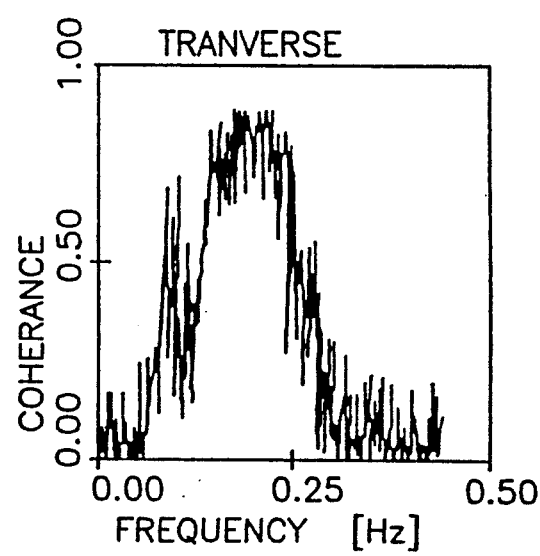
Figure 5A:
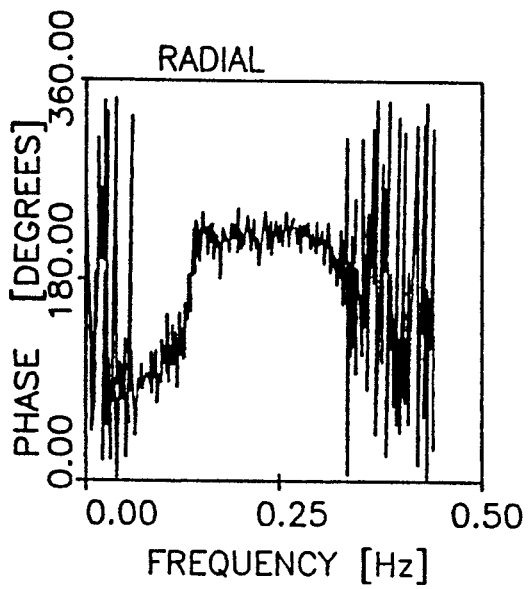
FIGS. 5(a)-5(d) show phase and coherence obtained according to this invention.
Figure 5B:
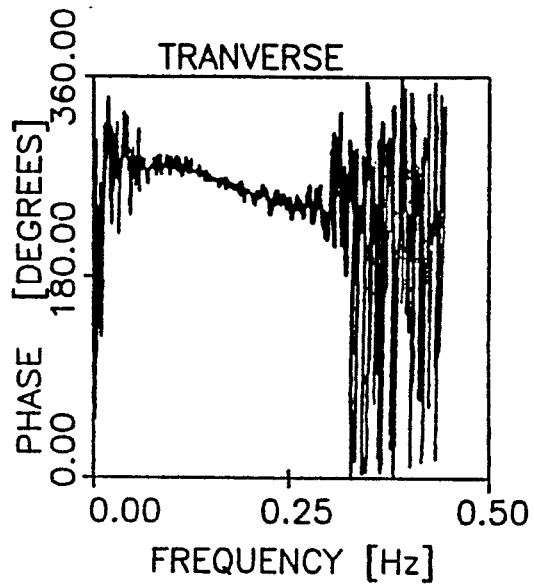
Figure 5C:
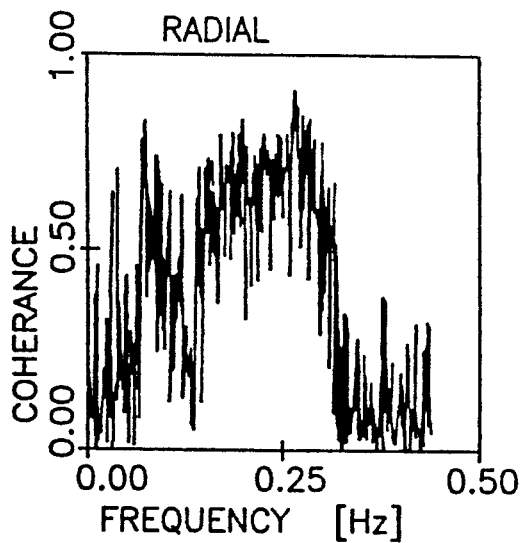
Figure 5D:
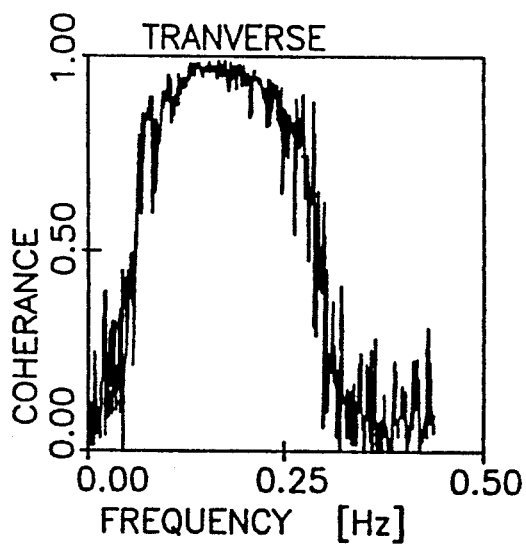
Figure 6A:
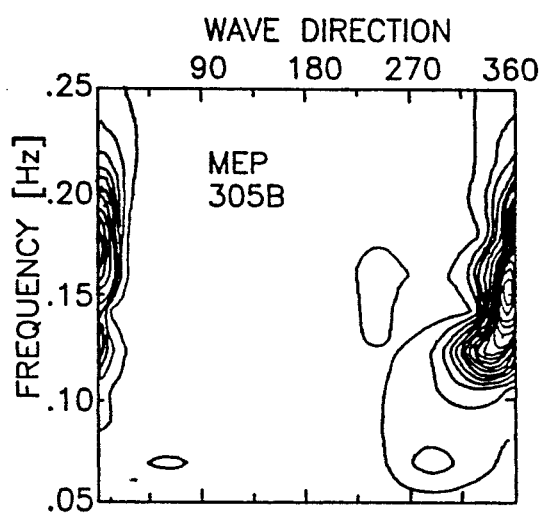
FIGS. 6(a)-6(d) are seismographs showing increased coherence products higher, more concentrated spectral peaks.

FIG. 3 comprises three sets of curves and shows the power spectra of the three signals (pressure, radial and transverse accelerations). FIG. 3 indicates that while the radial seismometer predicts the same energy as the pressure sensor, the transverse seismometer failed to measure some of the lower frequency waves. This is better represented by plots of coherence and phase (FIG. 4). The transverse seismometer signal is not coherent with the pressure signal at frequencies less than 0.15 Hz. The transverse phase abruptly swings away from 90° (where the phase should be, in theory) at frequencies less than 0.13 Hz. This is possibly because the longer period waves propagate in a mean direction of nearly 90° from the direction of the transverse seismometer and therefore it has little energy to measure. Several other mechanisms can be considered as the cause for the deviation in the measured phase from the theoretical value. In addition to the errors in the phase versus frequency response curves of the instruments supplied by the manufacturers, we have found that if the seismometer is tilted, the phase will wander from theoretical values. The latter amounts to phase errors up to 5° while the former may be responsible for errors up to 20°. Numerical simulations have shown, however, that the directional spectrum varies appreciably only when the phase deviations of both seismometers near 90° from theory. For example, if as in FIG. 4, the phase is near 180° (about 90° from theory), but the coherence is low in the transverse direction, while the phase is closer to 270° and the coherence is high in the radial direction, the radial direction dominates. The resulting directional spectra plot is acceptable at the low frequencies where this is the case (FIG. 6A).

FIG. 5 shows phase and coherence obtained according to this invention. In this case, having different orientation, the transverse coherence is good, but the radial coherence is quite poor. This is probably because the seismometer unit was not coupled well (buried sufficiently) to the seafloor. Near-bottom currents were affecting the radial seismometer. It is preferable according to this invention that the seismometers should be buried to a depth of about 0.5 meters below the seafloor to give good coherence where they produce relatively noise-free measurements.

Figure 6B:
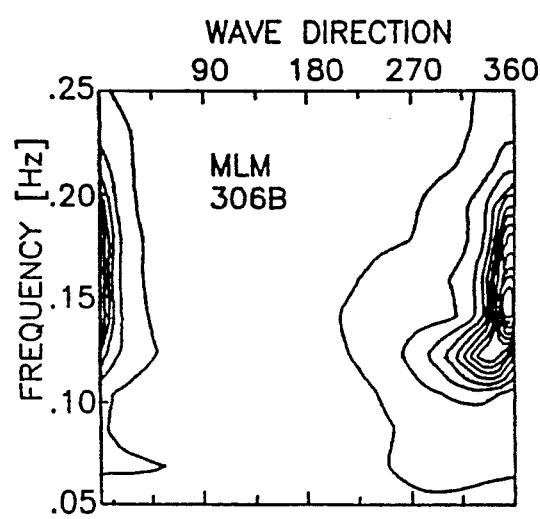
Figure 6C:
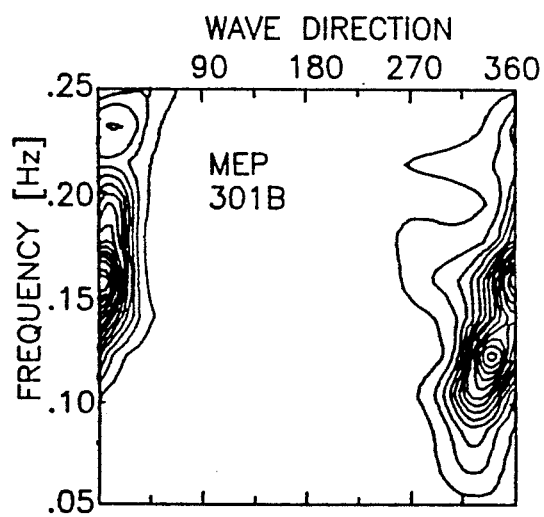

In any case, increased coherence produces higher, more concentrated spectral peaks in the estimates. Another seismograph (FIG. 6a) produced higher combined coherence than the seismograph used in FIG. 6c, and the difference between results is noticeable though the data were collected over the same time period and approximately 400 meters apart. FIG. 6a shows a directional spectral estimate that has a spectral peak at 0.145 Hz (about 7 second waves) and a direction of propagation toward 355°. The half-power angular spread at the peak is 25° and expands to 35° at higher frequencies and around 60° at low frequencies. This constriction at the peak is expected (Hashimoto et al, 1987: Report of the Port and Harbor Research Institute, Yokosuka, Japan). FIG. 6c, set 301B, predicts two peaks at 0.165 Hz, 360°; and 0.131 Hz, 340°. The peaks are lower and the spread wider than predicted by 305B. There is no notable constriction at the spectral peak nor the spread of energy at the low frequencies that unit 305 predicts. The half-power angular spreads at the peaks are 55° and 45°, respectively, while the spread at low frequency is less than 45°. It is believed that this difference results from better coupling to the sea floor and herefore high coherence for unit 305.

A numerical simulation was conducted using a Mitsuyasu-type directional distribution. The results do not depend on the type of measurement, but only tests the principle itself. The results are the same as found by Kobune and Hashimoto (1986) and therefore will not be repeated here. The study shows that the Maximum Entropy Principle (MEP) nearly reproduces the true spectrum for unidirectional seas and for bidirectional seas with the angle of separation between the two seas being greater than 60°. MLM, on the other hand, underestimates the spectral peak and shows energy in directional bands where there should be none. This smearing of the estimate is common for methods with directional resolution not as strong as MEP's. The experimental results show this difference between the methods. Comparing FIG. 6A (dataset 305B using the maximum entropy principle spectra estimation method (MEPOBS) and FIG. 6b (same dataset using the maximum likelihood method MLM) one can see that MEPOBS produces a higher spectral peak (0.330 m$^2$Hz$^{-1}$rad$^{-1}$) than MLM (0.270 m$^2$Hz$^{-1}$rad$^{-1}$) and a more concentrated spectral peak (25° half-power angular spread vs 35°+). The spectral peak wave propagation direction and frequency (355°, 0.145 Hz) remain the same as does the predicted significant wave height (0.53 m). (Significant wave heights are found from the integration of the 2D power spectrum of sea surface elevation and are given in Table 1.) Use of the MEP therefore produces a more detailed shape of the spectra than MLM. However, MLM still shows the peak direction and frequency while being a computationally faster technique because it does not require iterations. For most applications, the improved result by MEP will outweigh the excess cpu time.

It has been found that the spectral peak propagation direction is not exactly 180° from the mean wind direction as would be expected (see Table 1), but is offset by about 20° to the north. The lower frequency waves propagate toward the west (FIG. 6(b) shows longwave energy propagating to 290°), which is to be expected. Heading error of +10° mentioned in the previous section may be partially causing the offset. Simple refraction calculations show that waves traveling toward 15° with a period of 7 seconds will refract 5 degrees northward. The rest of the offset can be attributed to errors in estimating mean wind direction.

Figure 6D:
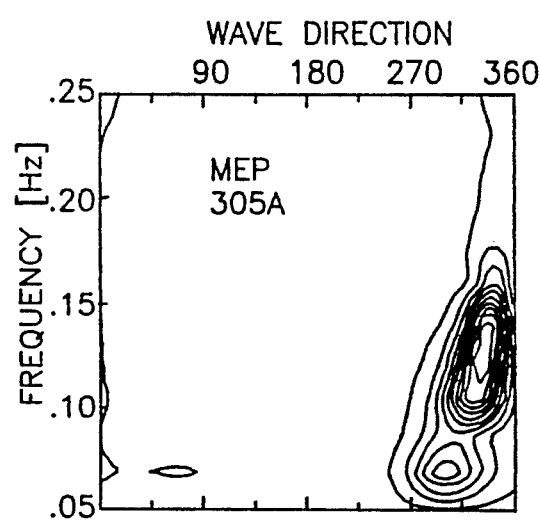

FIG. 6d shows directional spectra for dataset 305A [unit 305,(A)]. Lack of wind on this day produced almost no energy at shorter wavelengths. The spectral peak is at 0.131 Hz and 340° azimuth. Half-power angular spread at the peak is 45° and widens to 65° at low frequencies. The significant wave height is predicted to be (0.40 m) which is significantly less than for set 305B. Dataset 301A (not shown) is similar to 305A but with less resolution yet, again due to lower coherence.

Hashimoto et al (*Report of the Port and Harbor Research Institute*, Yokosuka, Japan, 1987) has compared MEP with other methods and concluded that "while it measures the direction of the spectral peaks . . . many wave properties need to be measured for a detailed analysis of the directional spectrum." It is believed these results (specifically FIG. 6a) show that an accurate representation of the directional spectra can be found by the method of this invention provided there is good coupling of the seismometer package 21 with the sea-bottom with respect to horizontal motions. Hashimoto et al later state that when only three wave properties are measured, MLM and MEP are recommended for use.

In 1990, experiments using a completely buried pressure gauge and seismometers have been successfully conducted.

Advantages of the Invention

The Maximum Entropy Principle utilizing measurements from an Ocean Bottom Seismometer called Buried Ocean Wave Directional Sensor (BOWDS) according to this invention can be used to determine with good accuracy the directional spectra of shallow water surface gravity waves. The directional resolution exhibited by this method is greater than that shown by MLM or any other prior art method of analysis of a single point, three-element wave record. It is possible that even better resolution or more detailed shape of the spectra may be possible if an array of wave probes is used. However, for field observations, the use of arrays is financially and technically infeasible in many cases. This makes the method of this invention advantageous for many applications.

For example, it is now possible to make observations of directional spectra of ocean waves using the method of this invention along much of a coastline to monitor sediment transport at relatively low cost.

Ocean bottom seismometers according to this invention need not be tethered to a ship as in the Examples in this specification. Radio telemetry of digital signals or hardwiring to shore or self-contained recording are other possibilities, the latter being well suited to measure sediment transport in storm conditions. Also, the fact that directional spectra can be measured using data collected to determine another important engineering consideration, the bottom shear modulus profile (U.S. Pat. No. 4,807,199), is an additional advantage. Properly buried seismometers tend to produce relatively noise-free data and are therefore well suited to give detailed shape of the directional spectra.

Due to attenuation of shorter wavelengths with depth, the method of this invention is limited to a relatively high frequency cutoff. Where the depth is approximately half of the high-frequency wavelength, background noise is of the same magnitude as the measured accelerations and the method tends to break down. The cutoff for the measured site was 0.25 Hz, i.e. waves with periods of less than 4 seconds could not be accurately measured. At deeper sites, only very low frequency waves can be measured, therefore, the method is only recommended for use in shallow to intermediate water depths. The method was limited to a low frequency cutoff of about 0.033 Hz (30 second waves) by the seismometers used in this study. This cutoff may be extended to about 0.005 Hz (200 second waves) using broadband seismometers such as GURALP CMG-3 (Yamamoto et al, *Geophys. J. Int.*, 98, 173–182, 1989.

In addition to ocean wave measurements, this invention is also capable of detecting the waves generated by moving objects such as ships, thus as a buried sensor for moving ships for military purposes.

Although this invention has been described with reference to specific seismometer packages, pressure sensors and test measurement techniques and frequencies, it will be appreciated that various equivalent instruments and test conditions may be substituted without departing from the spirit and scope of this invention, which is defined in the appended claims.

What is claimed is:

1. In a method of measuring directional spectra of surface gravity waves in a body of water having a sedimentary bottom and a plurality of waves moving above a bottom sediment, the steps which comprise:
   (a) selecting a measurement site at which the distance from the surface of the water to the bottom surface is less than the average wavelength of the gravity waves as measured along the surface of the water,
   (b) coupling a seismometer package with said bottom sediment,
   (c) deploying a pressure sensor on said bottom or buried within the sediment, and
   (d) periodically measuring the directional distribution function for the waves traveling through said sediment and the pressure detected by said pressure sensor.

2. The method defined in claim 1 wherein said seismometer is completely buried in said sediment beneath said bottom surface.

3. The method defined in claim 1 wherein said seismometer package is a single seismometer package.

4. The method defined in claim 1 wherein said seismometer package is buried in said sedimentary bottom to a depth of about 0.5 m.

5. The method defined in claim 1 wherein said seismometer package comprises a plurality of orthogonally mounted seismometers.

6. The method defined in claim 1, including the further steps of measuring the frequency spectra of said waves and correlating said spectra with said measured directional distribution function of said waves.

7. In an apparatus for measuring directional spectra of surface gravity waves in a body of water having a sedimentary bottom, the combination which comprises:
   (a) a seismometer package containing a plurality of orthogonally arranged seismometers adapted to be buried in said sedimentary bottom to detect and measure directional distribution function for waves traveling through said sediment,
   (b) a pressure sensor adapted to be disposed on said bottom or buried in the sediment to detect wave pressures, and
   (c) coupling means extending between said seismometers and said pressure sensor to correlate said measured signals of directional distribution function for said waves traveling through said sediment and said detected wave pressures.

8. The apparatus defined in claim 7 further including burial means for burying said seismometer package.

9. The apparatus defined in claim 8 wherein said burial means comprises a burial dome configured to surround said seismometer package above said sedimentary bottom,
   a magnetically attractive orienting coupling arranged for orienting said pressure sensor relative to said burial dome,
   pumping means for loosening said bottom sediment beneath said seismometer package to settle and couple said package with said sedimentary bottom, and
   means for disconnecting said orienting coupling and removing said burial dome after said package has been coupled to said sedimentary bottom.

10. A completely buried pressure gauge and a pair of seismometers of claim 7 as a hidden sensor for moving ships.

11. The combination defined in claim 10, including means whereby the combination can be turned so that it can be set to pick up a particular type of ship which generates gravity waves.

* * * * *